US012720380B2

(12) United States Patent
Dash et al.

(10) Patent No.: US 12,720,380 B2
(45) Date of Patent: Aug. 25, 2026

(54) UE HISTORY INFORMATION ENHANCEMENTS DURING MOBILITY TRANSFERS

(71) Applicant: Radisys Corporation, Hillsboro, OR (US)

(72) Inventors: Nalinikanta Dash, Puri (IN); Rajendra Prasad Kodaypak, Hillsboro, OR (US)

(73) Assignee: Radisys Corporation, Hilsboro, OR (US)

( * ) Notice: Subject to any disclaimer, the term of this patent is extended or adjusted under 35 U.S.C. 154(b) by 350 days.

(21) Appl. No.: 18/430,387

(22) Filed: Feb. 1, 2024

(65) Prior Publication Data

US 2024/0259897 A1 Aug. 1, 2024

Related U.S. Application Data

(60) Provisional application No. 63/482,765, filed on Feb. 1, 2023.

(51) Int. Cl.
*H04W 36/00* (2009.01)
*H04W 36/08* (2009.01)

(52) U.S. Cl.
CPC ..... *H04W 36/00833* (2023.05); *H04W 36/08* (2013.01)

(58) Field of Classification Search
CPC ........................ H04W 36/00833; H04W 36/08
USPC .......................................................... 455/436
See application file for complete search history.

(56) References Cited

PUBLICATIONS

3GPP TR 38.821 V16.1.0 (May 2021): "Solutions for NR to support non-terrestrial networks (NTN) (Release 16)", specification, published by Alliance for Telecommunications Industry Solutions, 2021, 140 pages.
3GPP TS 38.413 V17.3.0 (Dec. 2022): "NG-RAN; NG Application Protocol (NGAP)", specification, published by Alliance for Telecommunications Industry Solutions, 2022, 577 pages.
3GPP TS 38.423 V17.3.0 (Dec. 2022): "NG-RAN; Xn Application Protocol (XnAP)", specification, published by Alliance for Telecommunications Industry Solutions, 2022, 619 pages.

*Primary Examiner* — Joel Ajayi
(74) *Attorney, Agent, or Firm* — Stoel Rives LLP

(57) ABSTRACT

Embodiments described in this disclosure address issues arising due to a current cell having incomplete information about the NR ARFCN for reference point A for all other cells which are included within Last Visited NG-RAN Cell Information. A source NG-RAN CU signals UE History Information to a target NG-RAN CU in a handover message by determining whether the UE History Information includes a previous Last Visited NG-RAN Cell Information entry indicating a Network Type, an NR ARFCN for reference point A, and Cell Type that match those of the current cell associated with the source NG-RAN CU; and adding to the UE History Information a new Last Visited NG-RAN Cell Information entry indicating for the current cell the Network Type, the NR ARFCN for reference point A and the Cell Type.

17 Claims, 14 Drawing Sheets

200

```
⌄ Item 5: id-UEHistoryInformation
    ⌄ ProtocolIE-Field
          id: id-UEHistoryInformation (88)
          criticality: ignore (1)
        ⌄ value
            ⌄ UEHistoryInformation: 1 item
                ⌄ Item 0
                    ⌄ LastVisitedCell-Item: nG-RAN-Cell (0)
                        ⌄ nG-RAN-Cell: 0013f18400000800208000fb
                            ⌄ LastVisitedNGRANCellInformation
                                ⌄ globalCellID: nR-CGI (0)
                                    ⌄ nR-CGI
                                        ⌄ pLMNIdentity: 13f184
                                              Mobile Country Code (MCC): United States (311)
                                              Mobile Network Code (MNC): Unknown (48)
                                          nRCellIdentity: 0x0000008002
                                ⌄ cellType
                                      cellSize: small (1)
                                  timeUEStayedInCell: 251s
```

| IE/Group Name | Presence | Range | IE type and reference | Semantics description | Criticality | Assigned Criticality |
|---|---|---|---|---|---|---|
| Global Cell ID | M | | NG-RAN CGI 9.3.1.73 | | - | |
| Cell Type | M | | 9.3.1.98 | | - | |
| Time UE Stayed in Cell | M | | INTEGER (0..4095) | The duration of time the UE stayed in the cell, or set of NR cells with the same NR ARFCN for reference point A, in seconds. If the duration is more than 4095s, this IE is set to 4095. | - | |
| Time UE Stayed in Cell Enhanced Granularity | O | | INTEGER (0..40950) | The duration of time the UE stayed in the cell, or set of NR cells with the same NR ARFCN for reference point A, in 1/10 seconds. If the duration is more than 4095s, this IE is set to 40950. | - | |
| HO Cause Value | O | | Cause 9.3.1.2 | The cause for the handover. | - | |
| Last Visited PSCell List | | 0. <maxnoofPSCellsPerPrimaryCellinUEHistoryinfo> | | List of cells configured as PSCells. Most recent PSCell related information is added to the top of the list. | YES | ignore |
| >Last Visited PSCell Information | M | | 9.3.1.235 | The PSCell related information. | - | |

| IE/Group Name | Presence | Range | IE type and reference | Semantics description | Criticality | Assigned Criticality |
|---|---|---|---|---|---|---|
| NR ARFCN | M | | INTEGER (0.. maxNRARFCN) | RF Reference Frequency as defined in TS 38.104 [39], section 5.4.2.1. The frequency provided in this IE identifies the absolute frequency position of the reference resource block (Common RB 0) of the carrier. Its lowest subcarrier is also known as Point A. | | |
| Global Cell ID | M | | NG-RAN CGI | | - | |
| Cell Type | M | | ENUMERATED (verysmall, small, medium, large, ...) | | - | |
| Time UE Stayed in Cell | M | | INTEGER (0..4095) | The duration of time the UE stayed in the cell, or set of NR cells with the same NR ARFCN for reference point A, in seconds. If the duration is more than 4095s, this IE is set to 4095. | - | |
| Time UE Stayed in Cell Enhanced Granularity | O | | INTEGER (0..40950) | The duration of time the UE stayed in the cell, or set of NR cells with the same NR ARFCN for reference point A, in 1/10 seconds. If the duration is more than 4095s, this IE is set to 40950. | - | |
| HO Cause Value | O | | As indicated in TS 38.413 section 9.3.1.2 Cause | The cause for the handover. | - | |
| Last Visited PSCell List | | 0..<maxnoofPSCellsPerPrimaryCellinUEHistoryInfo> | | List of cells configured as PSCells. Most recent PSCell related information is added to the top of the list. | YES | ignore |
| >Last Visited PSCell Information | M | | As indicated in TS 38.413 section 9.3.1.235 | The PSCell related information. | - | |
| Network Type | O | | ENUMERATED ( Home Public Network , Visited Public Network , PNI-NPN , NPN , NTN, ....) | Indicates the 5G NR network deployment type for the Global Cell ID indicated within Last Visited NG-RAN Cell Information | - | |

UE HISTORY INFORMATION ENHANCEMENTS DURING MOBILITY TRANSFERS

RELATED APPLICATION

This application claims priority benefit of U.S. Provisional Patent Application No. 63/482,765, filed Feb. 1, 2023, which is hereby incorporated by reference in its entirety.

TECHNICAL FIELD

This disclosure relates generally to handover messages exchanged during mobility transfer in a wireless communication network and, more particularly, to UE History Information included in the handover message.

BACKGROUND INFORMATION

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi®.

In 3GPP radio access networks (RANs) in LTE systems, the base station can include a RAN node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next-generation Node B or g Node B (gNB)).

RANs use a radio access technology (RAT) to communicate between the RAN node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT. As used herein, the term "NG-RAN node" (or simply NG-RAN) may refer to a RAN node that operates in an NR or 5G system and the term "E-UTRAN node" or the like may refer to a RAN node that operates in an LTE or 4G system (e.g., an eNB).

An NG-RAN includes a radio unit (RU), a distributed unit (DU), and a central unit (CU), which in some embodiments may be implemented in a gNB (i.e., gNB-RU, gNB-DU, and gNB-CU). In general, the RU is the part of the network that is physically closest to the end user and is responsible for the radio transmission and reception. The RU is typically located on a tower or other high structure. The DU is the part of the network that is responsible for processing and forwarding data between the RU and the CU. The DU can be located either near the RU or centrally. The CU is the part of the network that is responsible for the control plane functions, such as managing the network and allocating resources. The CU is typically located in a central location, such as a data center.

In other embodiments, an NG-RAN may be implemented in an Open Radio Access Network (O-RAN). O-RAN is a disaggregated approach to deploying mobile fronthaul and midhaul networks built on cloud native principles. O-RAN is an evolution of the NG-RAN architecture, first introduced by the GSMA's 3GPP in its release 15 (5G version 1) technical specification TS 38.401. The O-RAN Alliance formed to undertake the advancement of NG-RAN philosophies, expanding on the scope of what was originally outlined by the 3GPP. An O-RAN includes an O-RAN RU (O-RU), an O-RAN DU (O-DU), and an O-RAN CU (O-CU).

The latest 5G cellular networking standards support new use cases such as enhanced mobile broadband (cMBB), ultra-reliable low latency communications (URLLC), massive machine type communications (mMTC), cellular vehicle to anything (CV2X) communications and several others that will benefit the industrial revolution into the next decade. Different industry verticals will leverage 5G O-RAN enabled connectivity and its benefits in different ways. Mobile network operators will seek to deliver unique service-level agreements (SLAs) to their customers based on specific use cases and their end-to-end emerging cloud native network infrastructure deployments while supporting interworking with other legacy and emerging access technologies.

SUMMARY OF THE DISCLOSURE

As the telecom industry gains momentum with 5G standalone wireless network infrastructure deployments, humans and machines will interconnect with these advanced networks to deliver rich innovative services. Dynamics of mobility is a consideration for driving mass adoption of 5G that will open new revenue opportunities across industry verticals and locations that have not connected and witnessed such possibilities before.

Accurate neighbor cell monitoring and selection based on historical UE information is disclosed for enhanced service experience when the end user/device performs mobility and handover procedures as they move, and their traffic patterns change dynamically across public/non-public/terrestrial/non-terrestrial/hybrid networks. This disclosure describes technical gaps in the standards and embodiments to facilitate accurate provisioning, identification, exchange, selection, and reporting of cell level information that is leveraged for programmable networks to use such intelligence to meet technical, operational, and business demands. The disclosed techniques facilitate new O-RAN network functions design via software features, licensing and competitive differentiation via new and enhanced product solutions; enable rich data analytics by exchanging such information in the ORAN domain towards the controller, orchestrator and cross-domain for intelligent traffic steering, offload, etc.; and enable home and roaming partners to always exchange their real-time UE mobility patterns as well as cell/tracking area/service area specific information for anomaly detection and enhancing their applications experience.

In some embodiments, a source NG-RAN CU signals UE History Information to a target NG-RAN CU in a handover message by: determining whether the UE History Information includes a previous Last Visited NG-RAN Cell Information entry indicating a Network Type, an NR ARFCN for reference point A, and a Cell Type that match those of the current cell associated with the source NG-RAN CU; in response to determining that the UE History Information lacks the previous Last Visited NG-RAN Cell Information entry, adding to the UE History Information a new Last Visited NG-RAN Cell Information entry indicating for the current cell the Network Type, the NR ARFCN for reference point A, and the Cell Type; and sending the UE History Information to the target NG-RAN CU in the handover message. In some embodiments, in response to determining that the UE History Information includes the previous Last Visited NG-RAN Cell Information entry, the source NG-RAN CU updates a previous NR CGI of the previous Last Visited NG-RAN Cell Information entry with a new NR CGI for the current cell update.

In some embodiments, a source NG-RAN CU generates UE History Information for a target NG-RAN CU in a handover message by determining whether the UE History Information includes a previous Last Visited NG-RAN Cell Information entry indicating an NR CGI that matches that of a current cell associated with the source NG-RAN CU; in response to determining that the UE History Information includes the previous Last Visited NG-RAN Cell Information entry, determining whether a sum of a time in the current cell plus a time in cell entry of the previous Last Visited NG-RAN Cell Information entry meets or exceeds a maximum time; and updating, based on the sum, the time in cell entry to provide an updated Last Visited NG-RAN Cell Information in the UE History Information to send to the target NG-RAN CU in the handover message.

In some embodiments, the source NG-RAN CU receives from an NG-RAN DU the NR ARFCN for reference point A in an F1 setup request or gNB-DU configuration. The source NG-RAN CU may be a source gNB-CU or a source O-CU. The source NG-RAN CU may be included in a public network, a visited network, a non-public network, a terrestrial network, a non-terrestrial network in which the Cell Type entry is one of NTN LEO Cell, NTN MEO Cell, NTN GEO Cell, NTN HEO Cell, or NTN UAS Platform.

In one aspect, a non-transitory machine-readable storage medium, the machine-readable storage medium includes instructions that when executed by a source NG-RAN CU, configure it to perform any of the aforementioned processes.

Additional aspects and advantages will be apparent from the following detailed description of embodiments, which proceeds with reference to the accompanying drawings.

BRIEF DESCRIPTION OF THE DRAWING FIGURES

To easily identify the discussion of any particular element or act, the most significant digit or digits in a reference number refer to the figure number in which that element is first introduced.

FIG. 2 is a hierarchical view of UE History Information, according to one embodiment.

FIG. 3 is a table showing IE definition for Last Visited NG-RAN Cell Information, according to one embodiment.

FIG. 6 is a table showing IE definition for Last Visited NG-RAN Cell Information, according to one embodiment.

DETAILED DESCRIPTION OF EMBODIMENTS

Figure 1:
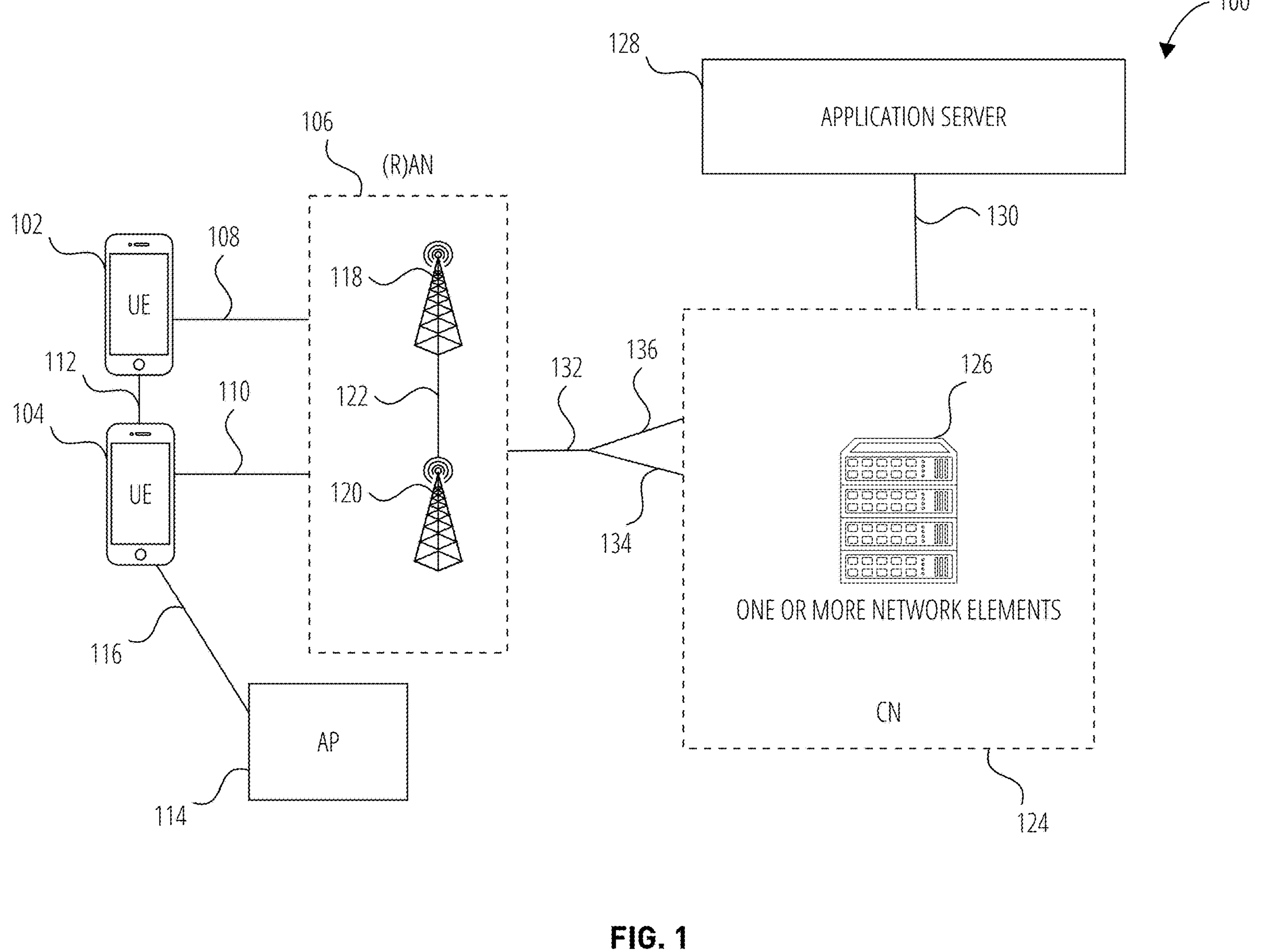
FIG. 1 is a block diagram of a wireless communications system, according to one embodiment.

FIG. 1 illustrates an example architecture of a system 100 of a network, in accordance with various embodiments. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)), IEEE 802.16 protocols (e.g., WMAN, WiMAX, etc.), or the like.

As shown by FIG. 1, system 100 includes UE 102 and UE 104. In this example, UE 102 and UE 104 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or “smart” appliances, MTC devices, M2M, IoT devices, and/or the like.

In some embodiments, UE 102 and/or UE 104 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the internet infrastructure), with short-lived connections. The IoT UEs may execute background applications (e.g., keep-alive messages, status updates, etc.) to facilitate the connections of the IoT network.

UE 102 and UE 104 may be configured to connect, for example, communicatively coupled, with an access node or radio access node (shown as (R)AN 106). In some embodiments, (R)AN 106 may be an NG-RAN or a 5G RAN, an E-UTRAN, or a legacy RAN, such as a UTRAN or GERAN. NG-RAN may refer to a (R)AN 106 that operates in an NR or 5G system, and E-UTRAN may refer to a (R)AN 106 that operates in an LTE or 4G system.

UE 102 and UE 104 utilize connections (or channels) (shown as connection 108 and connection 110, respectively), each of which comprises a physical communications interface or layer (discussed in further detail below). In this example, connection 108 and connection 110 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, an NR protocol, and/or any of the other communications protocols discussed herein. In embodiments, UE 102 and UE 104 may directly exchange communication data via a ProSe interface 112. ProSe interface 112 may alternatively be referred to as a sidelink (SL) interface 110 and may comprise one or more logical channels, including, but not limited to, a PSCCH, a PSSCH, a PSDCH, and a PSBCH.

UE 104 is shown to be configured to access an AP 114 (also referred to as "WLAN node," "WLAN," "WLAN Termination," "WT," or the like) via connection 116. Connection 116 can comprise a local wireless connection, such as a connection consistent with any IEEE 802.11 protocol, wherein the AP 114 would comprise a wireless fidelity (Wi-Fi®) router. In this example, AP 114 may be connected to the internet without connecting to the core network of the wireless system (described in further detail below). In various embodiments, UE 104, (R)AN 106, and AP 114 may be configured to utilize LWA operation and/or LWIP operation. The LWA operation may involve UE 104 in RRC_CONNECTED being configured by RAN node 118 or RAN node 120 to utilize radio resources of LTE and WLAN. LWIP operation may involve UE 104 using WLAN radio resources (e.g., connection 116) via IPsec protocol tunneling to authenticate and encrypt packets (e.g., IP packets) sent over connection 116. IPsec tunneling may include encapsulating the entirety of original IP packets and adding a new packet header, thereby protecting the original header of the IP packets.

(R)AN 106 can include one or more AN nodes, such as RAN node 118 and RAN node 120, that enable connection 108 and connection 110. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs, or TRPs, and so forth, and can comprise ground stations (e.g., terrestrial access points) or satellite stations providing coverage within a geographic area (e.g., a cell).

According to various embodiments, RAN node 118 or RAN node 120 may be implemented as one or more of a dedicated physical device such as a macrocell base station, and/or a low-power base station for providing femtocells, picocells, or other like cells having smaller coverage areas, smaller user capacity, or higher bandwidth compared to macrocells.

In some embodiments, all or parts of RAN node 118 or RAN node 120 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 118 or RAN node 120); a MAC/PHY split wherein RRC, PDCP, RLC, and MAC layers, are operated by the CRAN/vBBUP and the PHY layer is operated by individual RAN nodes (e.g., RAN node 118 or RAN node 120); or a "lower PHY" split wherein RRC, PDCP, RLC, and MAC layers and upper portions of the PHY layer are operated by the CRAN/vBBUP and lower portions of the PHY layer are operated by individual RAN nodes. This virtualized framework allows the freed-up processor cores of the RAN node 118 or RAN node 120 to perform other virtualized applications.

In some implementations, an individual RAN node may represent individual gNB-DUs that are connected to a gNB-CU via individual F1 interfaces (not shown in FIG. 1). In these implementations, the gNB-DUs may include one or more remote radio heads or RFEMs, and the gNB-CU may be operated by a server that is located in (R)AN 106 (not shown) or by a server pool in a similar manner as the CRAN/vBBUP. Additionally, or alternatively, one or more of RAN node 118 or RAN node 120 may be next-generation eNBs (ng-eNBs), which are RAN nodes that provide E-UTRA user plane and control plane protocol terminations toward UE 102 and UE 104, and are connected to a 5GC via an NG interface. In V2X scenarios one or more of RAN node 118 or RAN node 120 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, and applications/software to sense and control ongoing vehicular and pedestrian traffic. The RSU may operate on the 5.9 GHZ Direct Short Range Communications (DSRC) band to provide very low latency communications required for high-speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi® hotspot (2.4 GHz band) and/or provide connectivity to one or more cellular networks to provide uplink (UL) and downlink (DL) communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

RAN node 118 and/or RAN node 120 can terminate the air interface protocol and can be the first point of contact for UE 102 and UE 104. In some embodiments, RAN node 118 and/or RAN node 120 can fulfill various logical functions for (R)AN 106 including, but not limited to, RNC functions such as radio bearer management, uplink and downlink dynamic radio resource management and data packet scheduling, and mobility management.

In some embodiments, UE 102 and UE 104 can be configured to communicate using OFDM communication signals with each other or with RAN node 118 and/or RAN node 120 over a multicarrier communication channel in accordance with various communication techniques, such as, but not limited to, an OFDMA communication technique (e.g., for downlink communications) or an SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from RAN node 118 and/or RAN node 120 to UE 102 and UE 104, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. Several different physical downlink channels are conveyed using such resource blocks.

According to various embodiments, UE 102 and UE 104 and RAN node 118 and/or RAN node 120 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, UE 102 and UE 104 and RAN node 118 or RAN node 120 may operate using LAA, eLAA, and/or feLAA mechanisms. In these implementations, UE 102 and UE 104 and RAN node 118 or RAN node 120 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier-sensing operations may be performed according to a listen-before-talk (LBT) protocol.

LBT is a mechanism whereby equipment (for example, UE 102 and UE 104, RAN node 118 or RAN node 120, etc.) senses a medium (for example, a channel or carrier frequency) and transmits when the medium is sensed to be idle (or when a specific channel in the medium is sensed to be unoccupied). The medium-sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 102, AP 114, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15, or 20 MHz and a maximum of five CCs can be aggregated, and therefore a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC- and NAS-related activities. The other serving cells are referred to as SCells, and each SCell may provide an individual SCC for both UL and DL. The SCCs may be added and removed as required, while changing the PCC may require UE 102 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher layer signaling to UE 102 and UE 104. The PDCCH carries information about the transport format and resource allocations related to the PDSCH channel, among other things. It may also inform UE 102 and UE 104 about the transport format, resource allocation, and HARQ information related to the uplink shared channel. Typically, downlink scheduling (assigning control and shared channel resource blocks to UE 104 within a cell) may be performed at any of RAN node 118 or RAN node 120 based on channel quality information fed back from any of UE 102 and UE 104. The downlink resource assignment information may be sent on the PDCCH used for (e.g., assigned to) each of UE 102 and UE 104.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as EREGs. An ECCE may have other numbers of EREGs in some situations.

RAN node 118 or RAN node 120 may be configured to communicate with one another via interface 122. In embodiments where system 100 is an LTE system (e.g., when CN 124 is an EPC), interface 122 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB, information about successful in sequence delivery of PDCP PDUs to a UE 102 from an SeNB for user data, information of PDCP PDUs that were not delivered to a UE 102, information about a current minimum desired buffer size at the SeNB for transmitting to the UE user data, and the like. The X2-C may provide intra-LTE access mobility functionality, including context transfers from source to target eNBs, user plane transport control, etc.; load management functionality; and inter-cell interference coordination functionality.

In embodiments where system 100 is a 5G or NR system (e.g., when CN 124 is a 5GC), interface 122 may be an Xn interface. The Xn interface is defined between two or more RAN nodes (e.g., two or more gNBs and the like) that connect to a 5GC, between a RAN node 118 (e.g., a gNB) connecting to a 5GC and an eNB, and/or between two eNBs connecting to a 5GC (e.g., CN 124). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface, and mobility support for UE 102 in a connected mode (e.g., CM-CONNECTED) including functionality to manage the UE mobility for connected mode between one or more of RAN node 118 or RAN node 120. The mobility support may include context transfer from an old (source) serving RAN node 118 to a new (target) serving RAN node 120, and control of user plane tunnels between old (source) serving RAN node 118 to new (target) serving RAN node 120. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

(R)AN 106 is shown to be communicatively coupled to a core network in this embodiment, CN 124. CN 124 may comprise one or more network elements 126, which are configured to offer various data and telecommunications services to customers/subscribers (e.g., users of UE 102 and UE 104) who are connected to CN 124 via (R)AN 106. The components of CN 124 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of CN 124 may be referred to as a network slice, and a logical instantiation of a portion of CN 124 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 128 may be an element offering applications that use IP bearer resources with the core network (e.g., UMTS PS domain, LTE PS data services, etc.). The application server 128 can also be configured to support one or more communication services (e.g., VoIP sessions, PTT sessions, group communication sessions, social networking services, etc.) for UE 102 and UE 104 via the EPC. Application server 128 may communicate with CN 124 through an IP communications interface 130.

In embodiments, CN 124 may be a 5GC. As described in 3GPP TS 23.501, 5G CN 124 includes an access and mobility management function (AMF), a user plane function (UPF), a session management function (SMF), an authentication server function (AUSF), a network exposure function (NEF), a unified data management (UDM), a unified data repository (UDR), a short message service function (SMSF), a non-3GPP interworking function (N3IWF), a policy control function (PCF), an NF repository function (NRF), a network slice selection function (NSSF), an application function (AF), or other 5G core network functions. A charging function (CHF) introduced in the 5G system architecture allows charging services to be offered in connection with an operations support system and a business support system (OSS/BSS).

(R)AN 106 may be connected with CN 124 via an NG interface 132. In embodiments, NG interface 132 may be split into two parts, an NG user plane (NG-U) interface 134, which carries traffic data between RAN node 118 or RAN node 120 and a UPF, and an NG control plane (NG-C) interface 136, which is a signaling interface between RAN node 118 or RAN node 120 and AMFs.

In embodiments, CN 124 may be a 5G CN, while in other embodiments, CN 124 may be an EPC). Where CN 124 is an EPC, (R)AN 106 may be connected with CN 124 via an S1 interface 132. In embodiments, S1 interface 132 may be split into two parts, an S1 user plane (S1-U) interface 134, which carries traffic data between RAN node 118 or RAN node 120 and S-GW, and an S1-MME control plane interface 136, which is a signaling interface between RAN node 118 or RAN node 120 and MMEs.

In mobile networks, a handover, or handoff, refers to the process of transferring an active connection from one cell to another while the mobile device (i.e., UE) is in motion. This allows the UE to maintain its connection to the network as it moves between different cells, ensuring uninterrupted service.

There are several types of handovers that can occur in an LTE network, including: intra-frequency handover when the UE moves between cells that operate on the same frequency, inter-frequency handover when the UE moves between cells that operate on different frequencies, and inter-RAT handover when the UE moves between cells that operate on different radio access technologies, such as LTE and another technology like GSM or CDMA.

In a 5G NR network, the handover process is similar to that in an LTE network, but the handover messages are exchanged between two NG-RANs. When a UE moves from the coverage area of one NG-RAN to another, a handover process is triggered to transfer the active connection from the source NG-RAN to the target NG-RAN.

The handover process in a 5G NR network involves the following steps. The UE or the network detects that the signal strength of the current gNB is decreasing and that the signal strength of another gNB is increasing. The UE or the network measures the signal strength and quality of the target gNB and sends this information back to the network. The network selects the target gNB based on the measurement information. A handover message is exchanged between the source gNB and the target gNB to initiate and coordinate the handover process. The network sends a handover command to the UE. The UE tunes to the new frequency and establishes a connection with the target gNB. The network confirms that the handover was successful, and the UE is now connected to the new gNB.

The handover message exchanged between the source gNB and the target gNB contains information about the UE, as well as any other necessary parameters for the handover process. The target gNB receives this information as part of a handover procedure within a handover request message from the source gNB. In general, a handover message serves as a way for the source gNB and the target gNB to communicate and coordinate the handover process in order to ensure a seamless and uninterrupted connection for the UE. Information that may be included in the handover message includes the following: (1) UE identification: this includes the International Mobile Subscriber Identity (IMSI) of the UE and the temporary UE identifier assigned by the network during the handover process; (2) target gNB identification: this includes the cell identifier of the target gNB and the frequency and resource block (RB) assignments for the connection with the UE; (3) handover type: this specifies the type of handover that is being performed, such as an intra-frequency handover or an inter-frequency handover; (4) measurement information: this includes the signal strength and quality measurements of the target gNB that were collected by the UE or the network; (5) timing information: this includes the timing advance and other timing parameters that are necessary to synchronize the UE with the target gNB; and (6) UE History Information, an example of which is shown in FIG. 2.

As shown in FIG. 2, UE History Information 200 includes a Last visited cell 202 information element (IE), which is a list of cells visited by UE before being served by a target cell in active state. In legacy RAT technologies such as LTE, UMTS, and the like, the IE UE History Information is used to keep track of cells that a UE has been served by in active state, prior to the target cell. Likewise, for 5G, the information contained within the IE UE History Information is used at gNB for analytics and efficient radio resource management purposes. UE History Information for NR contains a Last Visited NG-RAN Cell Information IE, shown in FIG. 2 as a Last visited NG-RAN cell information 204 entry.

FIG. 3 shows the content of a Last Visited NG-RAN Cell Information 300 IE, as specified under 3GPP TS 38.413: "NG-RAN; NG Application Protocol (NGAP)." In the case of an NR cell, Last Visited NG-RAN Cell Information 300 includes information about a set of NR cells with the same NR absolute radio frequency channel number (NR ARFCN) for reference point A. A global cell ID 302 IE identifies one of the NR cells in the set. Other information in Last Visited NG-RAN Cell Information 300 includes Cell Type 304, time UE stayed in cell 306, and time UE stayed in cell enhanced granularity 308.

NR ARFCN is a numerical identifier used in 5G wireless networks to specify the carrier frequency of a particular channel. The NR ARFCN is used in the 5G NR standard to identify the carrier frequency of a particular channel in the radio spectrum. The range of NR ARFCN values is different for different frequency bands (e.g., FR1 and FR2) and the number of NR ARFCN values available in a given frequency band is also different.

The intention of this conventional implementation in NR is not to track every single cell change, but instead it is intended to track a cell change which will most likely be used for resource management at RRM. This implementation of IE UE History Information for NR cell has deficiencies, which are not addressed in current 3GPP standards.

Figure 4:
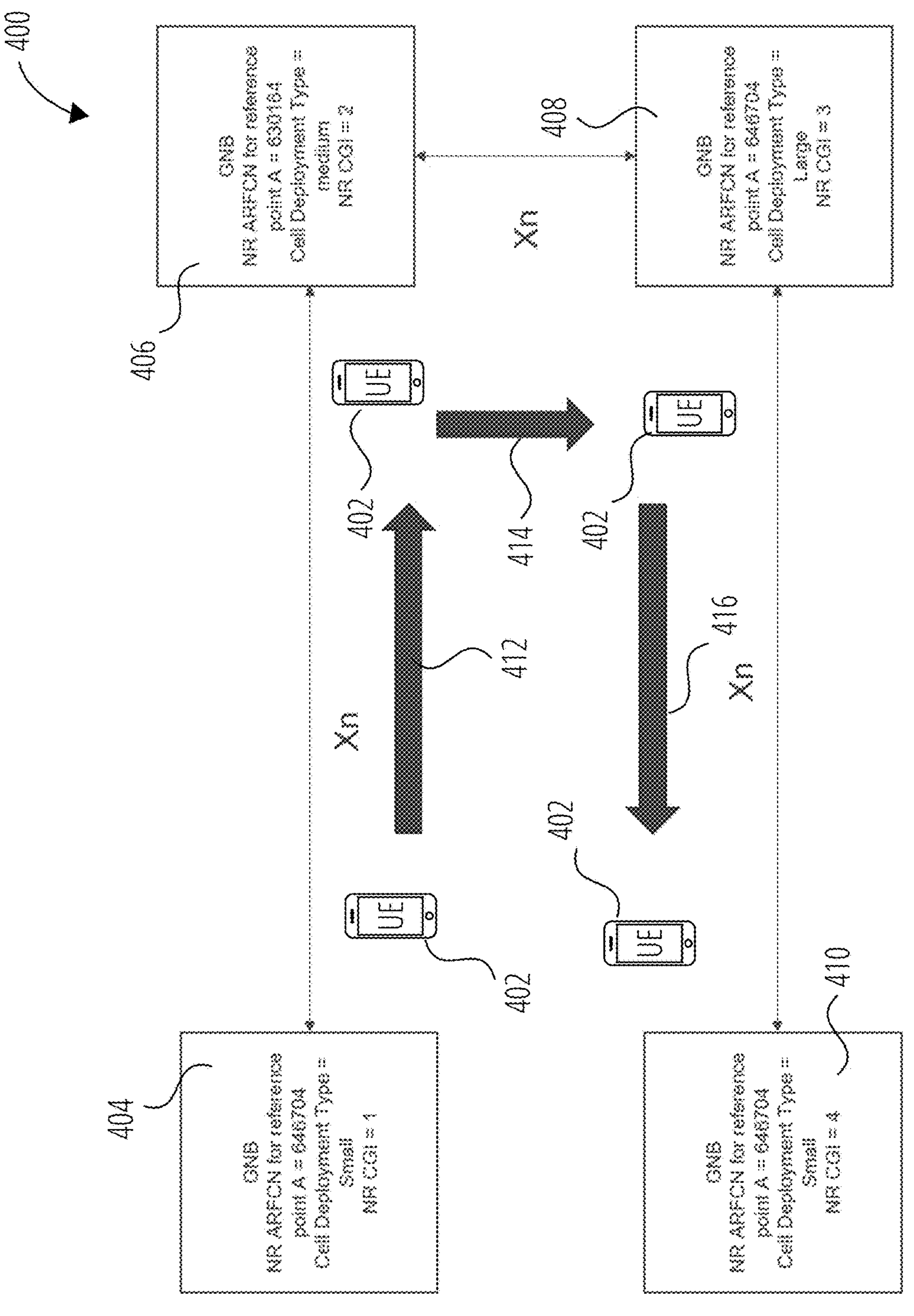
FIG. 4 is a block diagram showing an example of UE History Information handling during UE mobility, according to one embodiment.

To illustrate an example of the deficiencies, FIG. 4 shows a sequence 400 of steps involved in conventional handover processes, as a UE 402 moves from a gNB 404, to a gNB 406, to a gNB 408, and then to a gNB 410. An Xn link 412 is between gNB 404 and gNB 406. An Xn link 414 is between gNB 406 and gNB 408. And an Xn link 416 is between gNB 408 and gNB 410. Additional details on these Xn interfaces are available in 3GPP TS 38.423: "NG-RAN; Xn Application Protocol (XnAP)." In other embodiments, the gNBs may include O-RAN(s).

At gNB 404, its NR ARFCN for reference point A is 646704, its cell deployment type is a small cell, and its NR cell global identifier (NR CGI) is 1. UE 402 registered first to gNB 404 so when UE 402 moves from gNB 404 to gNB 406, a new entry will be added in UE History Information.

At gNB 406, its NR ARFCN for reference point A is 630164, its cell deployment type is a medium cell, and its NR CGI is 2. Through Xn link 412, gNB 406 is aware of the NR ARFCN for reference point A of gNB 404, which is different from the ARFCN for reference point A of gNB 406. Thus, a new entry will be added in UE History Information when UE moves from gNB 406 to gNB 408.

At gNB 408, its NR ARFCN for reference point A is 646704, its cell deployment type is large, and its NR CGI is 3. Through Xn link 414, gNB 408 is aware of the NR ARFCN for reference point A of gNB 406. But it is not aware of the NR ARFCN for reference point A of gNB 404 because there is no Xn link between gNB 408 and gNB 404. As a result, gNB 408 is not aware if its NR ARFCN for reference point A is already entered in the UE History Information, or if a new entry needs to be created when UE 402 moves from gNB 408 to gNB 410.

At gNB 410, its NR ARFCN for reference point A is 646704, its cell deployment type is small, and its NR CGI is 4. Through Xn link 416, gNB 410 is aware of the NR ARFCN for reference point A of gNB 408. In this situation, gNB 410 is also not aware about NR ARFCN for reference point A of gNB 404 and gNB 406. Accordingly, gNB 410 will not be able to determine if its NR ARFCN for point A is already entered in the UE History Information or if a new entry needs to be created when the UE moves from gNB 410.

As shown in FIG. 4, except for an immediate neighbor, a current gNB will not be aware about the NR ARFCN for reference point A for all the cells that a UE has visited. For an immediate neighbor's NR ARFCN for reference point A, a current gNB may have information via an Xn setup procedure.

Within IE Last Visited NG-RAN Cell Information 300 (FIG. 3), NR ARFCN for reference point A is not included. Thus, a current gNB will have no knowledge of whether the current NR ARFCN for reference point A used by that gNB has an entry already present in Last Visited NG-RAN Cell Information or whether a new entry must be created. Moreover, the same NR ARFCN for reference point A can be deployed with different Cell Types such as very small, small, medium, large, etc. As per the current specification, when an entry gets created for a particular NR ARFCN for reference point A, it should also contain NR CGI and Cell Type details. In some instances, a UE performs a handover in a sequence where all cells have the same NR ARFCN for point A, e.g., a small cell (cell ID 1) to a medium cell (cell ID 2) to a large cell (cell ID 3) and then to a small cell (cell ID 4). All these cells, however, would be classified into a single set as all cells have the same NR ARFCN for point A.

If a source gNB sends global cell ID as 4 and Cell Type as small towards a target gNB in the Last Visited NG-RAN Cell Information, then the target gNB will assume all cells the UE has been before on this NR ARFCN for point A are a small cell, which is incorrect. As the data contained with IE UE History Information is to be used for analytics purposes, the information provided within the Cell Type would be incorrect for the list of cells UE has been on. As the details within the specification are deficient, then each vendor may choose to implement IE UE History Information differently, which may lead to an inter-vendor operability issue.

The current specification also does not address UE History Information while moving across various different types of networks such as a terrestrial network, a non-terrestrial network (NTN), a public network, a non-public network (NPN), and the like.

Currently, the maximum number of entries within Last Visited NG-RAN Cell Information IE is 16. Since NR is mostly being deployed in mid- and higher-frequency bands, the cell radius will be relatively small. NR also supports wide varieties of bands with different possible bandwidth and different possible NR ARFCN for reference point A. Thus, 16 entries may not be optimal to correctly reflect UE mobility behavior while generating analytics or for efficient resource management.

As summarized above, there are several issues attributable to a current cell being unaware of the NR ARFCN for reference point A for all other cells included within Last Visited NG-RAN Cell Information. Set forth below are embodiments addressing the deficiencies in the current implementations.

Figure 5:
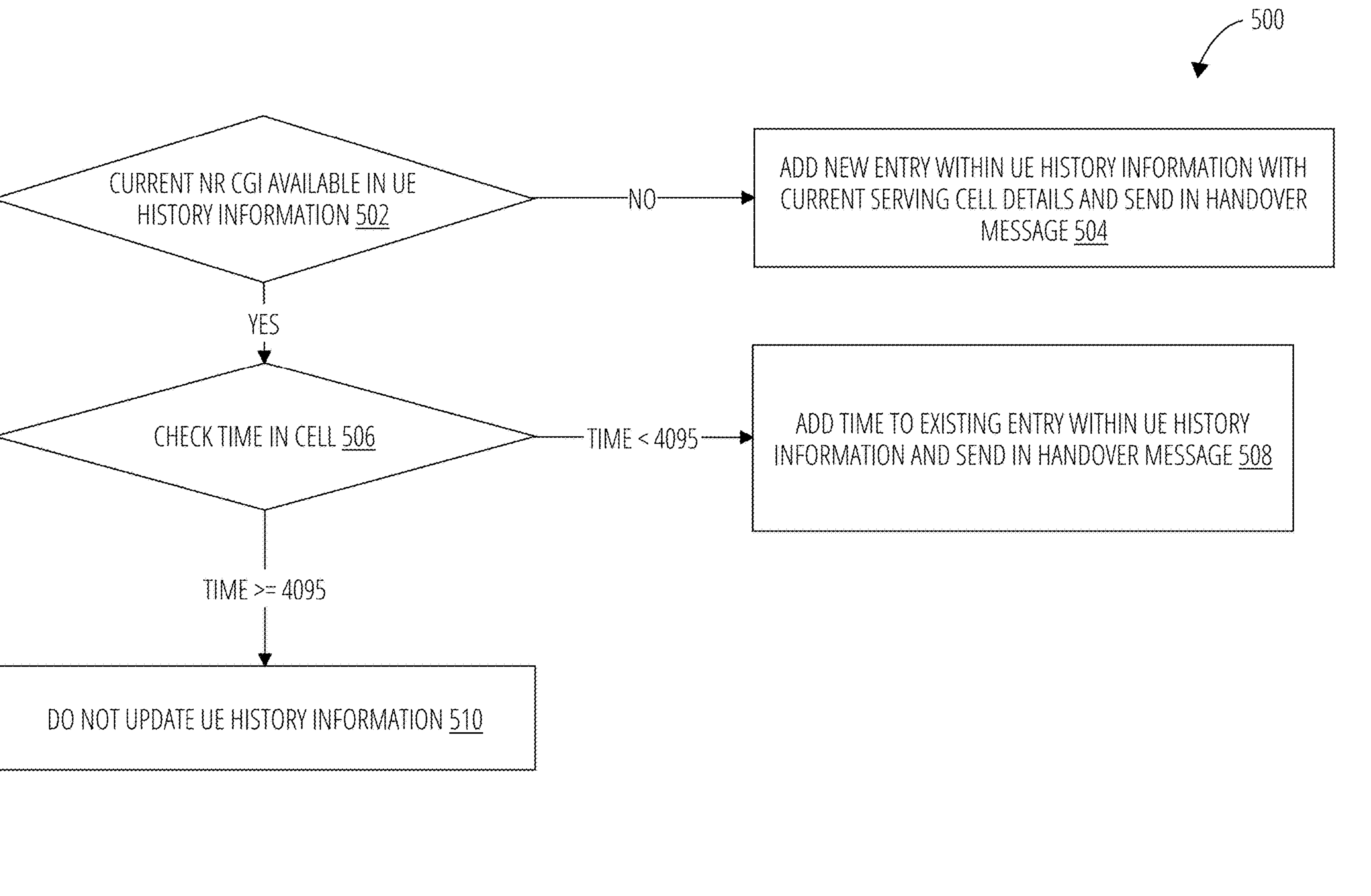
FIG. 5 is a flowchart of a process for handling UE History Information, according to one embodiment.

In a first embodiment shown in FIG. 5, a process 500 for updating Last Visited NG-RAN Cell Information entails including an NR CGI for each cell the UE has been on before in active mode with an update to the time in cell information (e.g., time UE stayed in cell 306 and time UE stayed in cell enhanced granularity 308, FIG. 3). Thus, any cell change done by the UE in connected mode would be included in the Last Visited NG-RAN Cell Information.

In one example, at decision block 502 a source NG-RAN CU checks whether the current NR CGI is available in UE History Information. If not, then at block 504 a new entry is added. If it is, then process 500 proceeds to decision block 506 for checking the time in cell information. If the time in the current cell plus the time from the existing entry is less than the max, then the time in the current cell is added to the existing entry and the updated entry is sent to the target source NG-RAN CU. If the time in the current cell plus the time from the existing entry is greater than or equal to the max, an updated entry is sent to the target source NG-RAN CU to indicate the maximum time has been reached or no update is sent when the time for the existing entry is already at the max.

Because the NR cells would have smaller perimeters due to medium and higher frequency being deployed, the number of entries within Last Visited NG-RAN Cell Information is increased from 16 to 128. 128 entries provides a higher resolution of UE mobility in NR for determining accurate behavior from an analytics and radio resource management prospective. Inclusion of NR CGI also resolves any ambiguity that results when classifying different cell sizes having the same NR ARFCN for reference point A. This approach need not entail IE changes, so existing IEs as defined in the current specification can be used in signaling. The drawback with this approach, however, would be that RRM may not use every single cell change for generating analytics and radio resource management, so some of the cell information becomes obsolete and has no use.

In a second embodiment shown in FIG. 6, an updated IE structure for Last Visited NG-RAN Cell Information is included in which each entry within Last Visited NG-RAN Cell Information contains an NR ARFCN for reference point A entry. An IE NR ARFCN 602 is newly introduced within Last Visited NG-RAN Cell Information. In an O-RAN deployment or a conventional deployment with an F1 interface, the DU will share NR ARFCN for reference point A in an F1 setup request or gNB-DU configuration update.

This second embodiment uses the existing criteria for classifying a set of NR cells with the same NR ARFCN for reference point A, and the NR CGI identifies one of the NR cells in the set. This allows a current cell to know whether its current NR ARFCN for reference point A entry has already been included within Last Visited NG-RAN Cell Information. If the current NR ARFCN for reference point A entry is not included within Last Visited NG-RAN Cell Information, then a new entry would be added by a current NG-RAN CU. In a case where an entry of NR ARFCN for reference point A for a current cell is already included within Last Visited NG-RAN Cell Information, then the current NG-RAN CU may update Last Visited NG-RAN Cell Information and forward it to the target NG-RAN CU during UE mobility as explained later with reference to FIG. 7.

FIG. 6 also shows an IE Network Type 604. As explained previously, the current standard indicates, "This [Last Visited NG-RAN Cell Information] IE contains information about a cell. In case of NR cell, this IE contains information about a set of NR cells with the same NR ARFCN for reference point A, and the Global Cell ID IE identifies one of the NR cells in the set. The information is to be used for RRM purposes." Thus, each entry within UE History Information containing Last Visited NG-RAN Cell Information will be classified into sets, as defined above, and one of the cells among them will be indicated in UE History Information within Last Visited NG-RAN Cell Information. Accordingly, each entry within Last Visited NG-RAN Cell Information indicates a Global Cell ID IE that identifies one of the NR cells in the set having same NR ARFCN for reference point A and same cell type. In FIG. 6, however, the additional IE Network Type 604 is included. This additional Network Type 604 information is explained with reference to FIG. 7.

Figure 7:
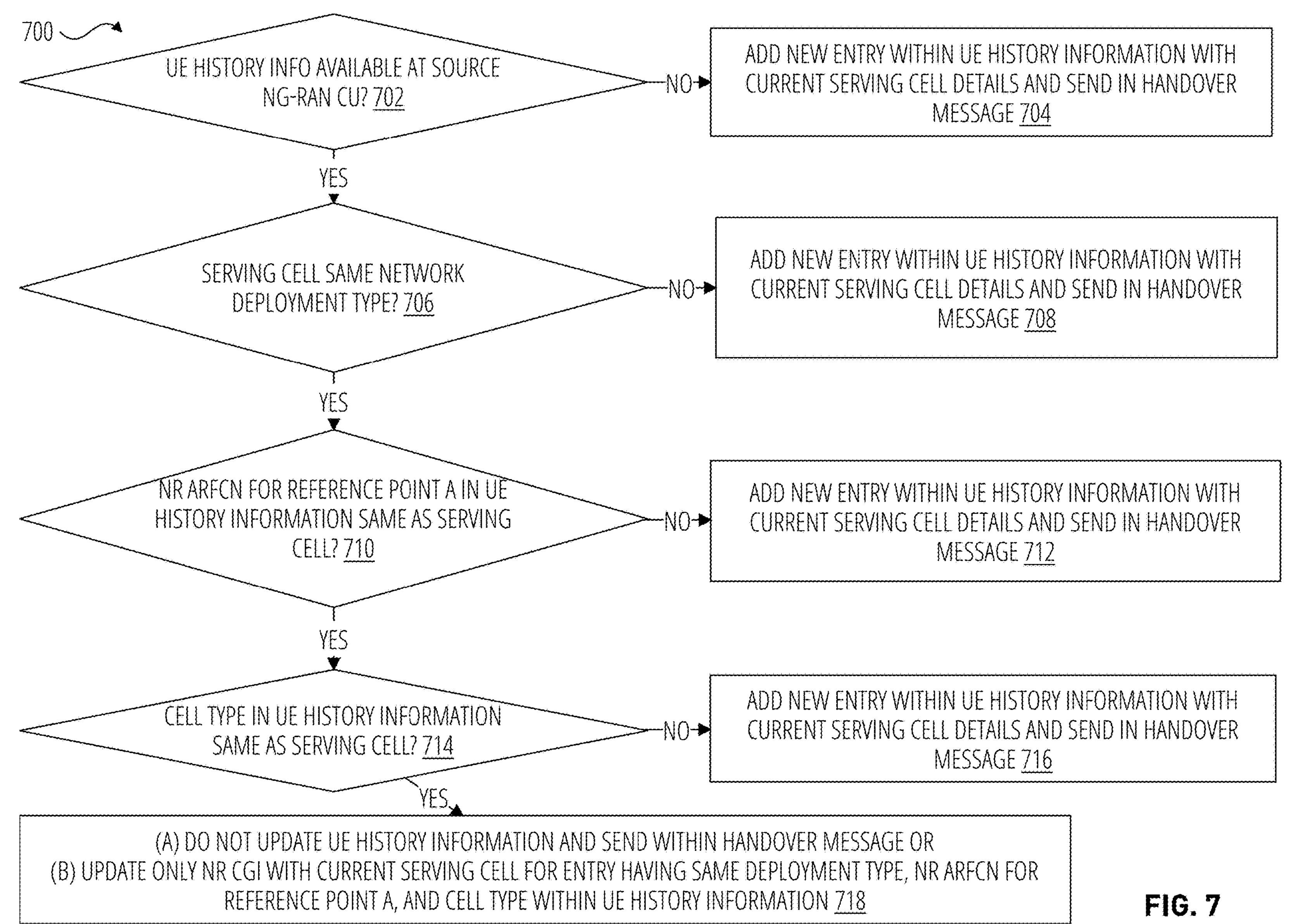
FIG. 7 is a flowchart of a process for handling UE History Information in connection with a public network, according to one embodiment.

FIG. 7 shows a process 700, performed by an NG-RAN CU (i.e., a gNB-CU or O-CU handling cell detection information), for UE History Information handling in connection with UE mobility within a one network, or from one network deployment type to another network deployment type such as a public network (FIG. 8), a visited network (FIG. 9), an NPN (FIG. 10-FIG. 12), an NTN (FIG. 13), or other network. Although the example process 700 depicts a particular sequence of operations, the sequence may be altered without departing from the scope of the present disclosure. For example, some of the operations depicted may be performed in parallel or in a different sequence that does not materially affect the function of process 700. In other examples, different components of an example device or system that implements process 700 may perform functions at substantially the same time or in a specific sequence.

At decision block 702, process 700 entails a source NG-RAN CU checking whether UE History Information is available. For a particular UE, if the source NG-RAN CU is a first NG-RAN CU that the UE has attached to, then UE History Information will not be available for the UE. Therefore, if it is not available, then at block 704 process 700 entails adding a new entry within UE History Information showing current serving cell details to send in a handover message. However, if the UE is admitted through a handover, then UE History Information will be available at the NG-RAN CU for the UE. If the UE History Information is available, then process 700 proceeds to decision block 706.

At decision block 706, the source NG-RAN CU checks whether the current serving cell is for a same network deployment type or a different network deployment type such as NPN, NTN, etc. The source NG-RAN CU compares the network deployment type between the current cell and all the cells received as part of UE History Information in a Handover Request for the UE when UE is handed over to current cell. The reason it does so is to create separate entry in UE History Information for cells having different network deployment types irrespective of NR ARFCN for reference point A and Cell Type. For instance, if the current cell is a public network and mobility happens to an NPN, NTN, visited network, or other network deployment type, then these networks would have a different network deployment type. And if it is different, then at block 708 process 700 entails adding a new entry within UE History Information as described for block 704. If it is the same, then process 700 proceeds to decision block 710.

At decision block 710, the source NG-RAN CU checks whether the NR ARFCN for reference point A in the UE History Information is the same as that of the current serving cell. If it is not, then at block 712 process 700 entails adding a new entry as described for blocks 704 and 708. If it is, then process 700 proceeds to decision block 714.

At decision block 714, the source NG-RAN CU checks whether the Cell Type in the UE History Information is the same as that of the serving cell. If it is not, then at block 716 process 700 entails adding a new entry as described for blocks 704, 708, and 712. The same NR ARFCN for reference point A can be deployed with a different Cell Type. Issues arise due to classifying a set of NR cells with the same NR ARFCN for reference point A. Therefore, cells with a different Cell Type will have separate entry in UE History Information, even when NR ARFCN for reference point A is the same. This will resolve incorrect interpretation of the Cell Type at target NG-RAN CU and inter-vendor operability issues, if any. If the Cell Type is the same, however, then process 700 proceeds to block 718.

At block 718, process 700 entails either (A) not updating UE History Information to send within the handover message, or (B) updating only NR CGI with the current cell for an entry having a same deployment type, NR ARFCN for reference point A, and Cell Type within UE History Information. For option B, the source NG-RAN CU may choose to update only the NR CGI part in order to reflect the latest cell that the UE has been on for a particular NR ARFCN for reference point A. Option A and B are possible alternatives, so selection of each alternative is subject to either vendor implementation or a services-based delivery model.

In a scenario where the serving cell NR CGI is already present in UE History Information, and if the time in the current cell plus the time from the existing entry is less than the max, then the time in the current cell is added to the existing entry and the updated entry is sent to the target source NG-RAN CU. If the time in the current cell plus the time from the existing entry is greater than or equal to the max, an updated entry is sent to the target by source NG-RAN CU to indicate the maximum time has been reached or no update is sent when the time for the existing entry is already at the max.

Figure 8:
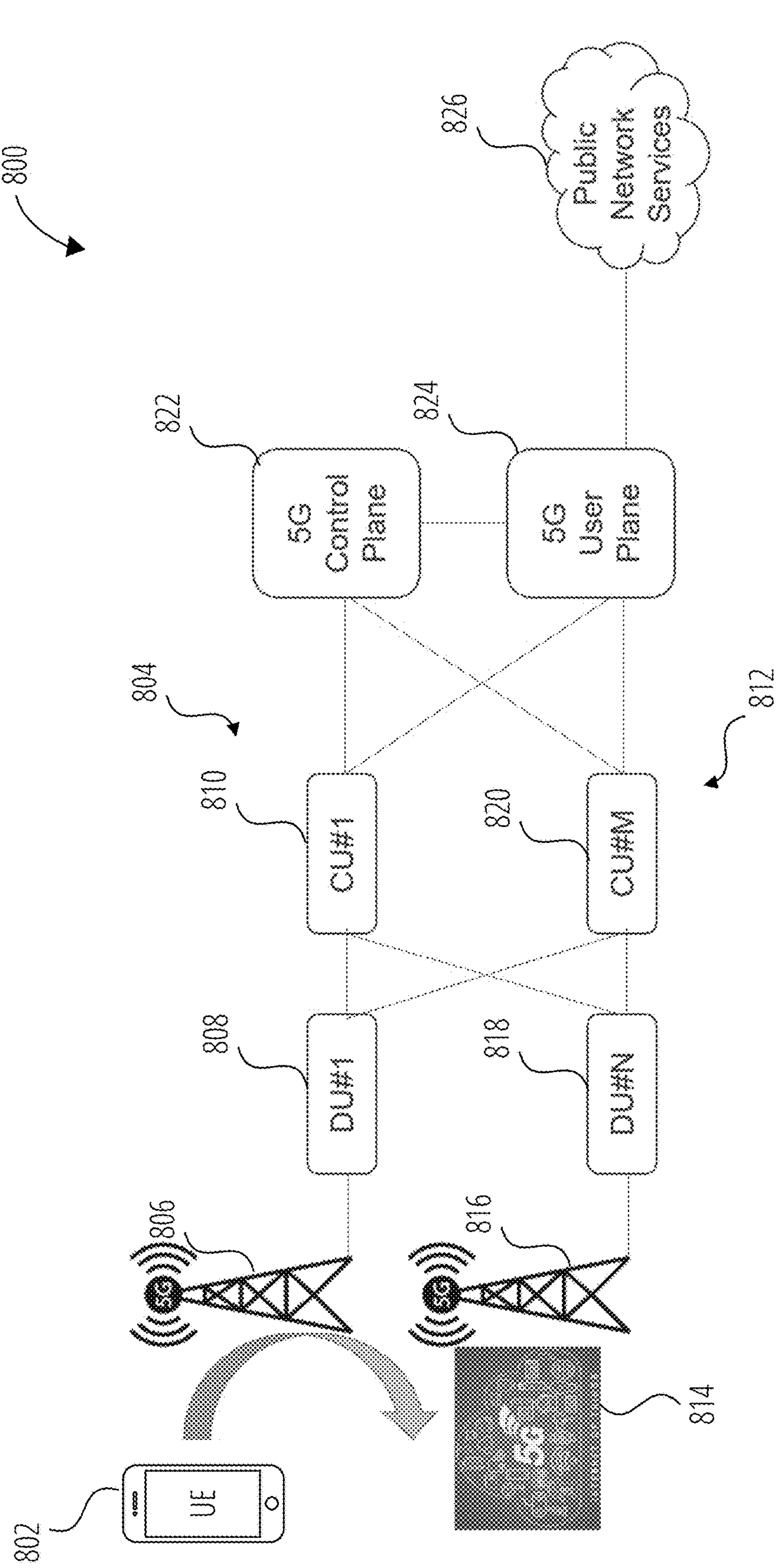
FIG. 8 is a block diagram showing mobility in a public network, according to one embodiment.

FIG. 8 shows an example of mobility within a home public mobile network (HPLMN) HPLMN 800. In the example of HPLMN 800, a UE 802 is connected to a first RAN 804 including an RU 806, a DU 808, and a CU 810. In a handover, UE 802 moves to join a second RAN 812 supporting 5G devices 814. Second RAN 812 includes an RU 816, a DU 818, and a CU 820.

In this example, each RAN 804 and 812 is represented as a disaggregated RAN architecture for mobile networks that separates a control plane function 822 and a user plane function 824 into two distinct entities. UE 802 thereby accesses public network services 826.

FIG. 8 also shows that CU 810 in first RAN 804 is capable of supporting DU 818 in second RAN 812. Likewise, CU 820 in second RAN 812 is capable of supporting DU 808 in first RAN 804. This configuration of RUs, DUs, and CUs allows for greater flexibility and scalability in the network, as well as the ability to more easily add new capabilities and services.

Figure 9:
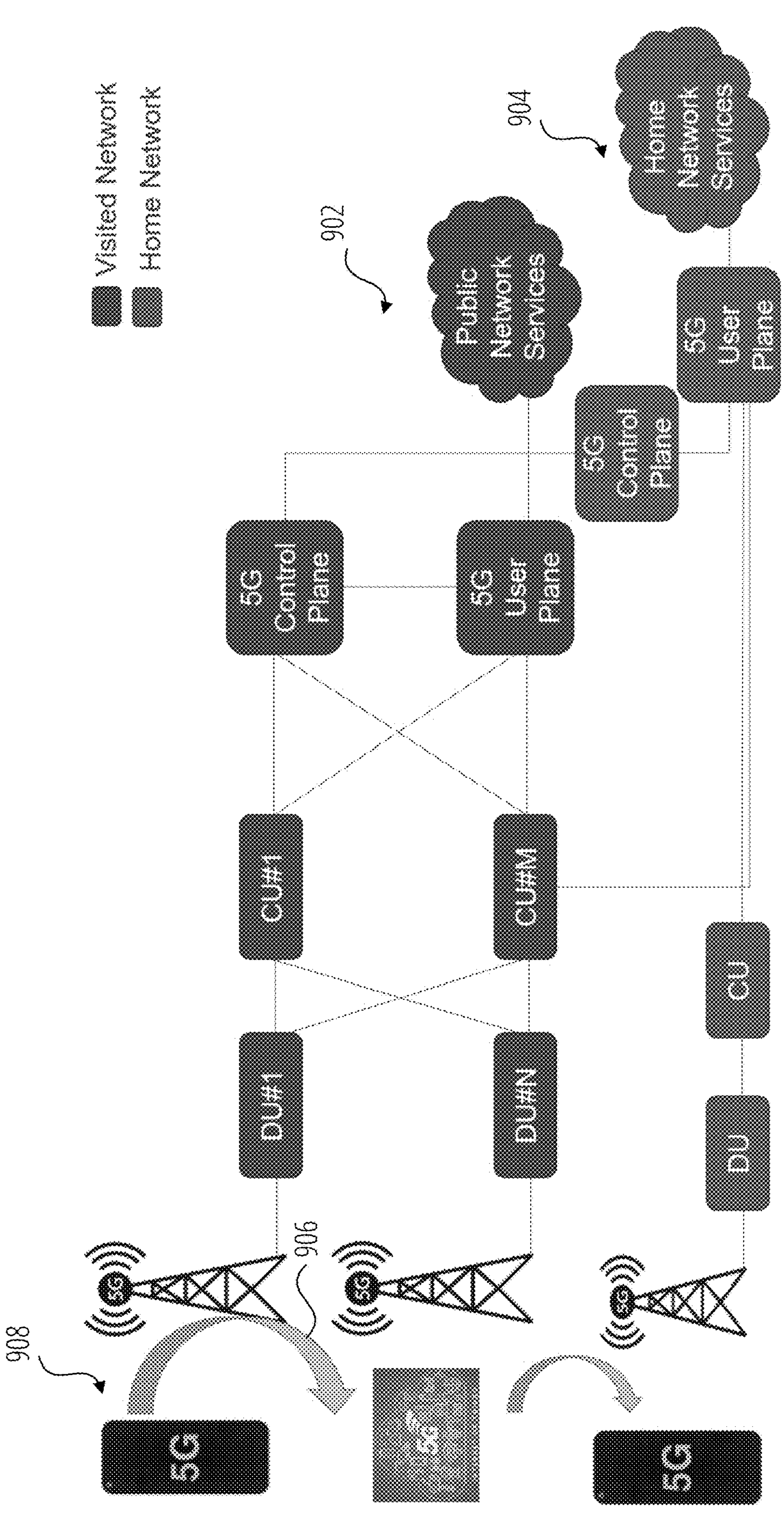
FIG. 9 is a block diagram showing mobility during roaming, according to one embodiment.

FIG. 9 shows an example of UE History Information handling during mobility between a visited network 902 (also called roaming network 902) and a home network 904. In roaming network 902, a new entry will be created within Last Visited NG-RAN Cell Information if both NR ARFCN for reference point A and cell size is same between home network 904 and roaming network 902 as the network deployment type is different. When a UE 908 does mobility within home network 904, if both NR ARFCN for reference point A and cell size is same, then a new entry within UE History Information need not be created. However, when mobility happens between home network 904 and visited network 902, although both NR ARFCN for reference point A and cell size is the same, a new Last Visited NG-RAN Cell Information entry would be created based on different network deployment type. The intention behind this is to know exactly at what cell UE 908 has entered to visited network 902, which are differentiated based on PLMN mentioned within NR CGI. This will help to differentiate home network 904 and visited network 902 entries within Last Visited NG-RAN Cell Information. If one or both NR ARFCN for reference point A and cell size values are different, then by default a new entry will be created within Last Visited NG-RAN Cell Information. For mobility between inter deployment types such as NPN, NTN, Visited Network, etc., a new entry within Last Visited NG-RAN Cell Information will be created if any of the NR ARFCN for reference point A, cell size, and Network Type is different.

For mobility 906 within visited network, Last Visited NG-RAN Cell Information entry criteria will follow a similar pattern as mentioned for public network 800 (FIG. 8). Likewise, for mobility between roaming network 902 and an NTN (see, e.g., FIG. 13) or an NPN (see, e.g., FIG. 10-FIG. 12) will follow a similar approach as mentioned for a public network. This approach will help an operator in generating exact statistics for UE mobility in home network 904 and visited network 902.

Figure 10:
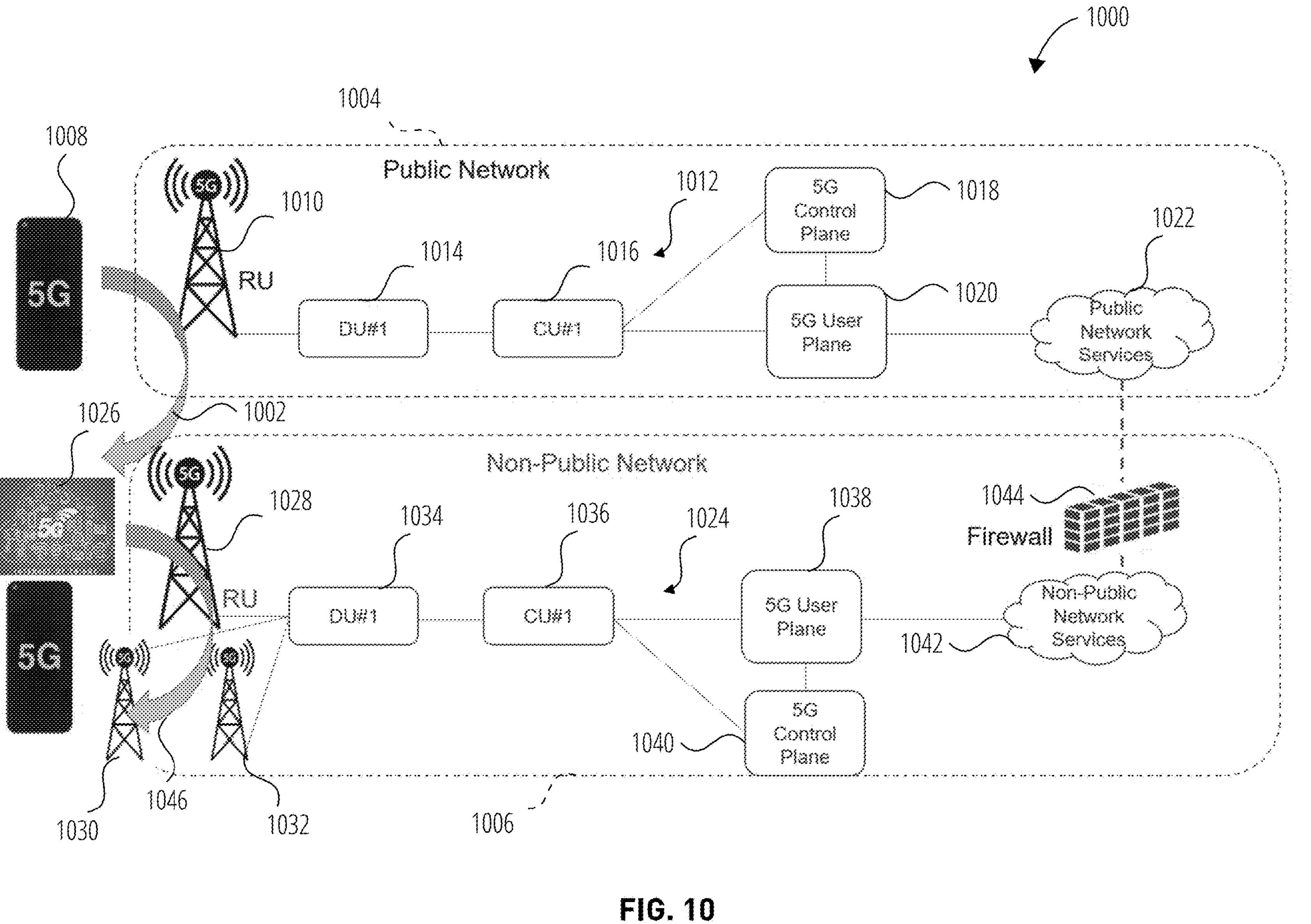
FIG. 10 is a block diagram showing mobility between a public and a non-public network, according to one embodiment.

FIG. 10 shows a 5G communication system 1000 with an example of mobility 1002 between a public network 1004 (PLMN) and an isolated/standalone NPN 1006 (such as a private network deployed by an enterprise). In some embodiments, an NPN can be deployed as Public Network Integrated Non-Public Network (PNI-NPN) or Standalone Non-Public Network (SNPN). In this example, a UE 1008 accesses public network 1004 via an RU 1010, which is part of a first RAN 1012 including RU 1010, a DU 1014, and a CU 1016 connected to a 5G control plane 1018 and a 5G user plane 1020 for access to public network services 1022.

UE 1008 may then perform mobility between NPN 1006 and public network 1004. For NPN 1006, a certain PLMN may be allocated, which will differentiate between public and private networks, and UE 1008 can determine if it is allowed to access private network 1006 after reading CAG identifier or NID broadcast within SIB1, respectively, for PNI-NPN and SNPN. In a handover, UE 1008 moves to join a second RAN 1024 supporting 5G devices 1026. Second RAN 1024 includes multiple RU 1028, 1030, and 1032; a DU 1034; and a CU 1036 connected to a 5G user plane 1038 and a 5G control plane 1040 for access to NPN services 1042. Public network services 1022 are also accessible through a firewall 1044 between NPN services 1042 and public network services 1022.

In terms of handling UE History Information with reference to the mobility example of FIG. 10, if public network 1004 and NPN 1006 share the same NR ARFCN for reference point A and are of different Cell Types, then a new entry would be created within Last Visited NG-RAN Cell Information in UE History Information IE as the network deployment type is different. For different NR ARFCN for reference point A and Cell Type, a new entry would be created by default within Last Visited NG-RAN Cell Information. If both public network 1004 and NPN 1006 have the same NR ARFCN for reference point A and Cell Type, a new entry would be created within Last Visited NG-RAN Cell Information in order to differentiate between public network 1004 and NPN 1006 based on Network Type IE received in Last Visited NG-RAN Cell Information. For mobility between inter deployment types such as NPN, NTN, Visited Network, etc., a new entry within Last Visited NG-RAN Cell Information will be created if any of the NR ARFCN for reference point A, cell size, and Network Type is different.

For mobility 1002 within NPN 1006, if one or both NR ARFCN for reference point A and Cell Type are different, then a new entry would be created within Last Visited NG-RAN Cell Information in UE History Information IE. For mobility 1046 within NPN 1006, a new entry within Last Visited NG-RAN Cell Information will be created when one or both NR ARFCN for reference point A and Cell Type are different.

Segregating different cells means categorizing cells of different deployment into different entries within UE History Information. Thus, segregating different cells that a UE has been to in active mode within public and private networks will provide insight and statistics on the UE mobility pattern for analytics purposes along with different key performance indicator (KPI) parameters such as handover statistics for a handover between a public network and NPN, handover statistics for a handover between a private network with a homogeneous type of deployment or a heterogeneous type of deployment. An operator may use this information for better coverage planning and use provided KPI statistics for enhancing the user experience.

Figure 11:
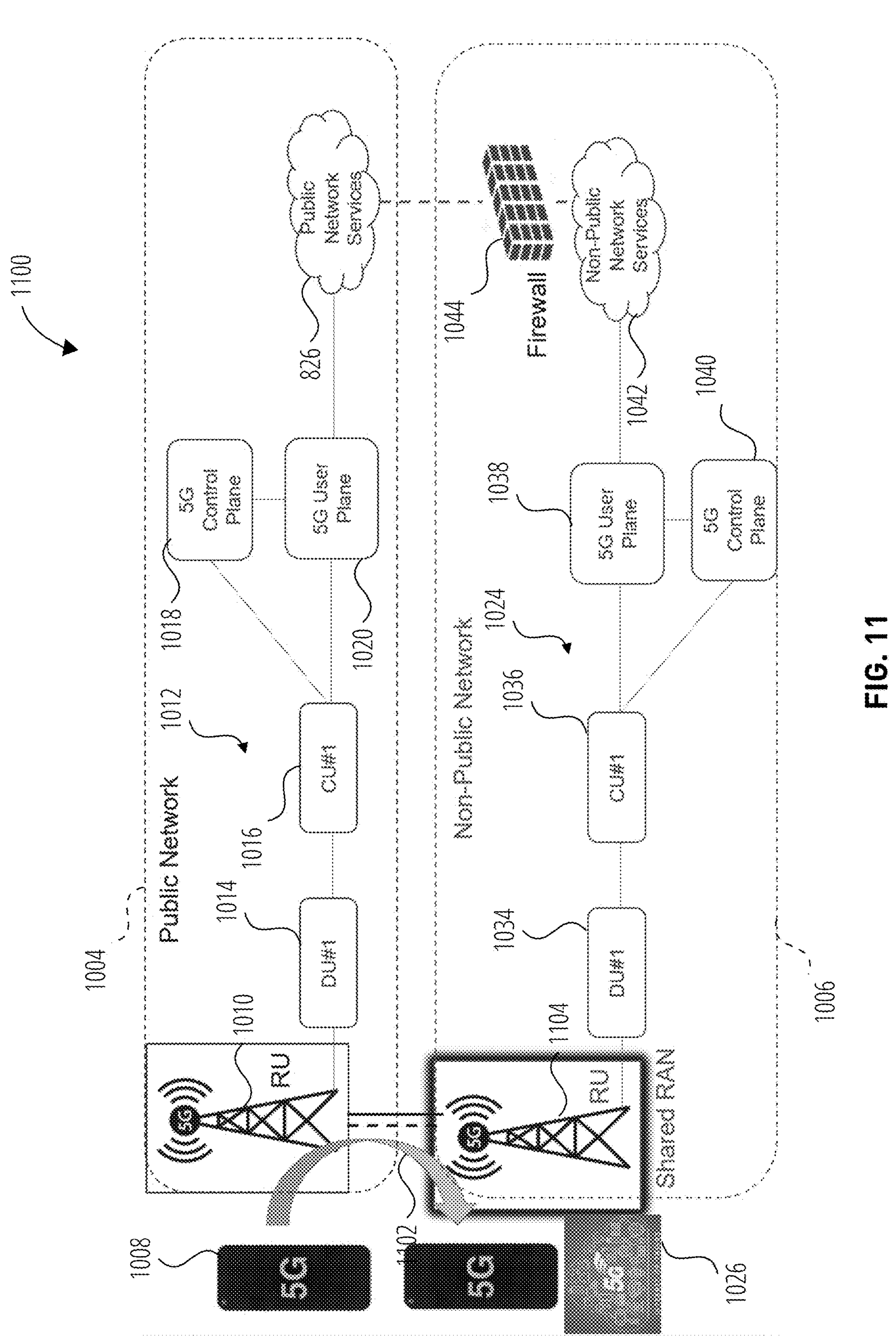
FIG. 11 is a block diagram showing mobility between a public and a non-public network, according to another embodiment.

FIG. 11 shows another 5G communication system 1100 with an example of mobility 1102 between public network 1004 and NPN 1006, which in this embodiment is a shared RAN. Since UE 1008 is moving to a different deployment, the Last Visited NG-RAN Cell Information would need to be updated as described previously in connection with FIG. 10. In this example, NR ARFCN for reference point A, Cell Type, and other parameters would most likely remain same during the shared RAN deployment.

Figure 12:
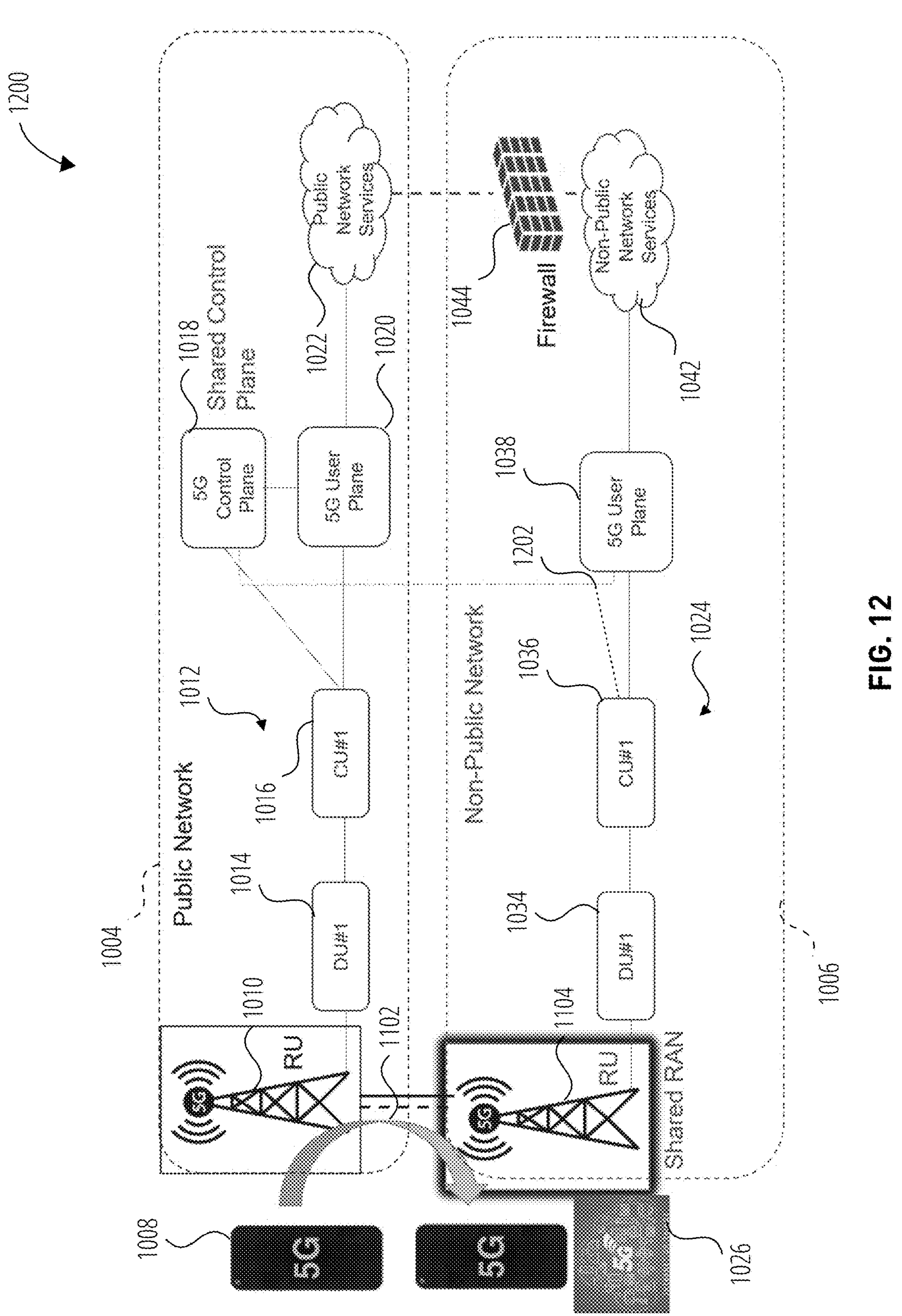
FIG. 12 is a block diagram showing mobility between a public and a non-public network, according to another embodiment.

FIG. 12 also shows a 5G communication system 1200 with an example of mobility 1102 between public network 1004 and shared-RAN NPN 1006. In the example of FIG. 12, there is also a 5G shared control plane 1202. As described previously, since UE 1008 is moving to a different deployment, the Last Visited NG-RAN Cell Information would need to be updated as described previously in connection with FIG. 10.

Figure 13:
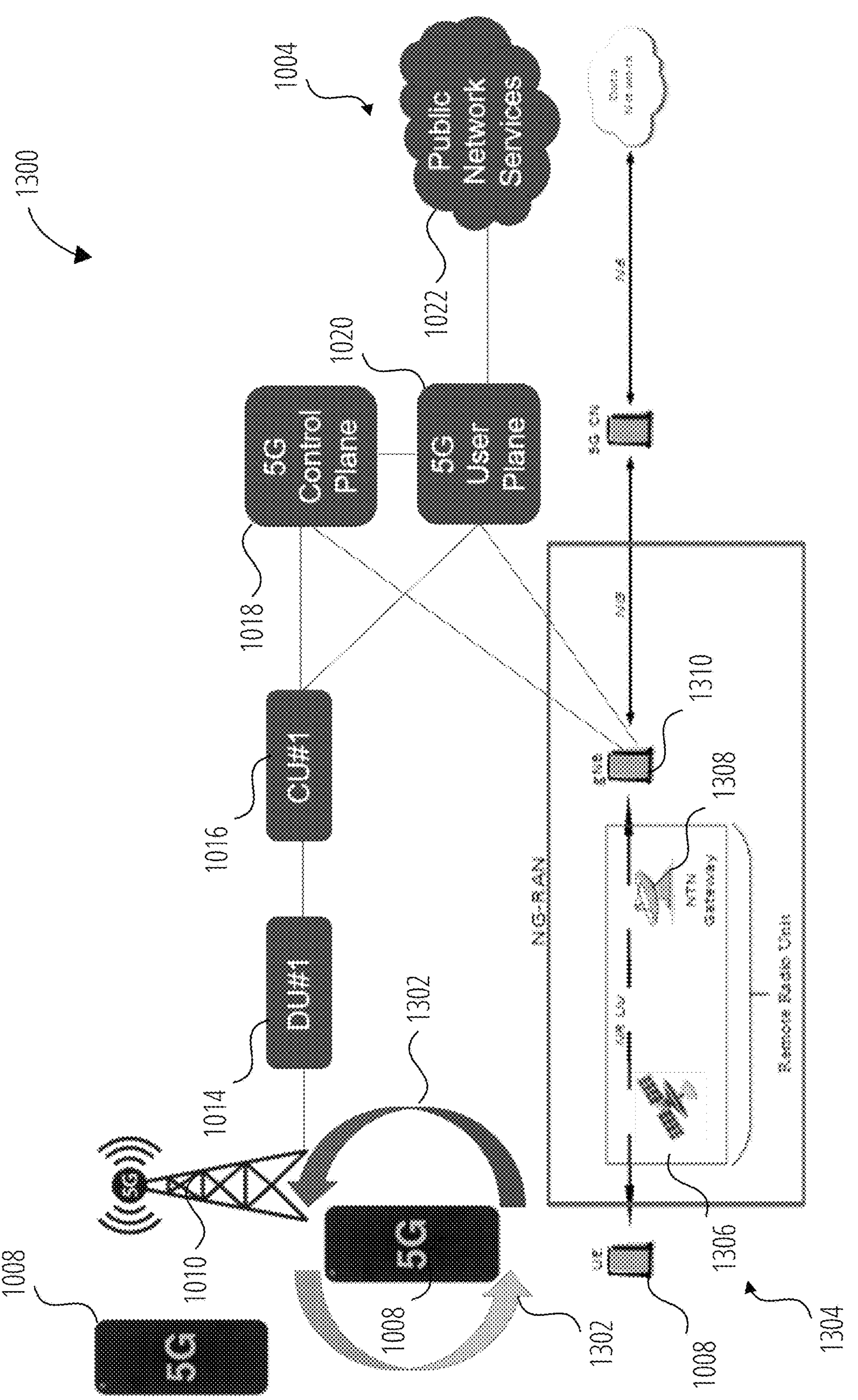
FIG. 13 is a block diagram showing mobility between a public and a non-terrestrial network, according to one embodiment.

FIG. 13 shows a 5G communication system 1300 with an example of mobility 1302 between PLMN 1004 (FIG. 10) and an NTN 1304. NTN 1304 includes a satellite 1306, an NTN gateway 1308, and a gNB 1310, which interfaces with 5G control plane 1018 and 5G user plane 1020. Additional details are available in 3GPP TR 38.821: "Solutions for NR to support non-terrestrial networks (NTN)."

An NTN cell can be deployed with different satellites providing different coverage such as LEO Satellite, MEO Satellite, GEO Satellite, HEO Satellite, UAS Platform, etc.

Each of these NTN cells will have different cell sizes. In the current specifications (3GPP TS 38.413), the Cell Type IE supports the following values.

| IE/ Group Name | Presence | Range | IE Type and Reference | Semantics Description |
|---|---|---|---|---|
| Cell Size | M | | ENUMERATED (very small, small, medium, large, . . .) | |

Current Cell Type IE does not address mobility 1302 between a terrestrial network and an NTN. To enable this functionality, the Cell Type IE is enhanced as follows. To accurately reflect Cell Type when a UE moves to or from an NTN cell, additional Cell Types are defined.

| IE/Group Name | Presence | Range | IE Type and Reference | Semantics Description |
|---|---|---|---|---|
| Cell Size | M | | ENUMERATED (very small, small, medium, large, NTN LEO Cell, NTN MEO Cell, NTN GEO Cell, NTN HEO Cell, NTN UAS Platform, . . .) | NTN LEO Cell: Indicates deployment of NTN cells using Lower Earth Orbit Satellite which has an altitude range of 300-1400 Km with circular orbit around earth. NTN MEO Cell: Indicates deployment of NTN cells using Medium Earth Orbit Satellite which has an altitude range of 7000-25000 Km with circular orbit around earth. NTN GEO Cell: Indicates deployment of NTN cells using Geostationary Earth Orbit Satellite which has an altitude range of 35786 Km with fixed position in terms of elevation/ azimuth with respect to a given earth point. NTN HEO Cell: Indicates deployment of NTN cells using High Elliptical Orbit Satellite which has an altitude range of 400-50000 Km with elliptical orbit around earth. NTN UAS Platform: Indicates deployment of NTN cells using Unmanned Aerial System having altitude of 8-50 Km with fixed position in terms of elevation/azimuth with respect |

Inclusion of different deployment types of NTN with Cell Types will accurately reflect the UE mobility in an active state between different NTN cells or between NTN and terrestrial cells. The proposed solution of indicating NR ARFCN for reference point A is also applicable while performing mobility between terrestrial and NTN cells.

A new entry within Last Visited NG-RAN Cell Information will be created for mobility between a public network and an NTN irrespective of values of NR ARFCN for reference point A as the network deployment type is different. Cell type has no role to play as NTN cells and public network cells will have different Cell Types. NTN cells having the same NR ARFCN for reference point A and the same NTN Cell Type will be classified into a single set and the global cell ID IE identifies one of the NTN cells in the set.

UE History Information over NTN Cell Type will provide analytical info such as geographical coverage information, handover statistics for handovers between NTN and terrestrial network, handover statistics for handovers between different NTNs with different Cell Types and the same Cell Type, etc.

In another embodiment, for mobility between an NPN and an NTN, a new entry within Last Visited NG-RAN Cell Information is created irrespective of whether NR ARFCN for reference point A is the same or different as the network deployment type is different. Cell type need not be checked in this case as an NPN and an NTN will always have different Cell Types.

Figure 14:
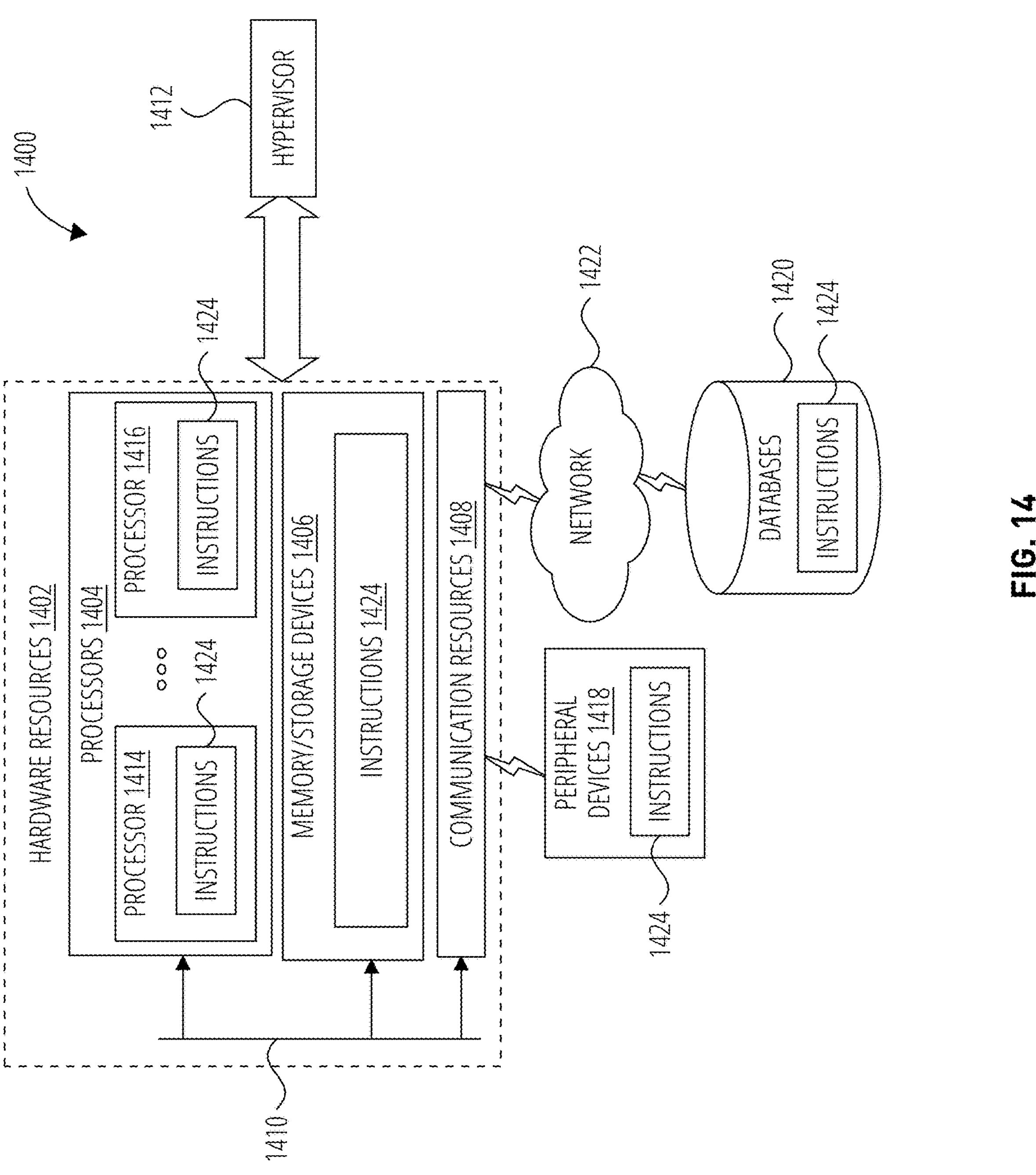
FIG. 14 is a block diagram of computing components for performing the disclosed procedures, in accordance with one embodiment.

FIG. 14 is a block diagram illustrating components 1400, according to some example embodiments, that are able to read instructions from a machine-readable or computer-readable medium (e.g., a non-transitory machine-readable storage medium) and perform any one or more of the methods discussed herein, such as process 500 (FIG. 5) and process 700 (FIG. 7).

Specifically, FIG. 14 shows a diagrammatic representation of hardware resources 1402 including one or more processors 1404 (or processor cores), one or more memory/storage devices 1406, and one or more communication resources 1408, each of which may be communicatively coupled via a bus 1410. For embodiments where node virtualization (e.g., NFV) is utilized, a hypervisor 1412 may be executed to provide an execution environment for one or more network slices/sub-slices to utilize hardware resources 1402.

Processors 1404 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio frequency integrated circuit (RFIC), another processor, or any suitable combination thereof) may include, for example, a processor 1414 and a processor 1416.

Memory/storage devices 1406 may include main memory, disk storage, or any suitable combination thereof. Memory/storage devices 1406 may include, but are not limited to any type of volatile or non-volatile memory such as dynamic random-access memory (DRAM), static random-access memory (SRAM), erasable programmable read-only memory (EPROM), electrically erasable programmable read-only memory (EEPROM), Flash memory, solid-state storage, etc.

Communication resources 1408 may include interconnection or network interface components or other suitable devices to communicate with one or more peripheral devices 1418 or one or more databases 1420 via a network 1422. For example, communication resources 1408 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1424 may comprise software, a program, an application, an applet, an app, or other executable code for causing at least any of processors 1404 to perform any one or more of the methods discussed herein. Instructions 1424 may reside, completely or partially, within at least one of processors 1404 (e.g., within the processor's cache memory), memory/storage devices 1406, or any suitable combination thereof. Furthermore, any portion of instructions 1424 may be transferred to hardware resources 1402 from any combination of peripheral devices 1418 or databases 1420. Accordingly, the memory of processors 1404, memory/storage devices 1406, peripheral devices 1418, and databases 1420 are examples of computer-readable and machine-readable media.

In light of this disclosure, skilled persons will appreciate that many changes may be made to the details of the above-described embodiments without departing from the underlying principles of the invention. The scope of the present invention should, therefore, be determined only by claims and equivalents.

What is claimed is:

1. A method, performed by a source new radio 5th generation (NG) radio access network (RAN) (NG-RAN) central unit (NG-RAN CU) for a current cell, of signaling user equipment (UE) History Information to a target NG-RAN CU in a handover message, the method comprising:
- receiving from an NG-RAN distributed unit (DU) a new radio (NR) absolute radio frequency channel number (NR ARFCN) for reference point A in an F1 setup request or next generation nodeB (gNB) DU (gNB-DU) configuration update;
- determining that the UE History Information lacks a previous Last Visited NG-RAN Cell Information entry indicating a Network Type, an NR ARFCN for reference point A, and a Cell Type that match those of the current cell associated with the source NG-RAN CU;
- in response to determining that the UE History Information lacks the previous Last Visited NG-RAN Cell Information entry, adding to the UE History Information a new Last Visited NG-RAN Cell Information entry indicating for the current cell the Network Type, the NR ARFCN for reference point A, and the Cell Type; and
- sending the UE History Information to the target NG-RAN CU in the handover message;
- wherein:
  - the source NG-RAN CU is included in a non-terrestrial network; and
  - the Cell Type is one of non-terrestrial network (NTN) lower earth orbit (LEO) Cell, NTN medium earth orbit (MEO) Cell, NTN geostationary earth orbit (GEO) Cell, NTN high elliptical orbit (HEO) CELL, or NTN unmanned aerial system (UAS) Platform.

2. The method of claim 1, further comprising, in response to determining that the UE History Information includes the previous Last Visited NG-RAN Cell Information entry, updating a previous new radio (NR) cell global identifier (NR CGI) of the previous Last Visited NG-RAN Cell Information entry with a new NR CGI for the current cell.

3. The method of claim 1, in which the source NG-RAN CU is a source gNB-CU.

4. The method of claim 1, in which the source NG-RAN CU is a source open-RAN (O-RAN) CU (O-CU).

5. The method of claim 1, in which the source NG-RAN CU is included in a public network.

6. The method of claim 1, in which the source NG-RAN CU is included in a visited network.

7. The method of claim 1, in which the source NG-RAN CU is included in a non-public network.

8. The method of claim 1, further comprising:
- in response to determining that the UE History Information includes the previous Last Visited NG-RAN Cell Information entry, determining whether a sum of a time in the current cell plus a time in cell entry associated with the previous Last Visited NG-RAN Cell Information entry meets or exceeds a maximum time; and
- updating, based on the sum, the time in cell entry to provide an updated Last Visited NG-RAN Cell Information in the UE History Information to send to the target NG-RAN CU in the handover message.

9. A method, performed by a source new radio 5th generation (NG) radio access network (RAN) (NG-RAN) central unit (CU) (NG-RAN CU), of signaling user equipment (UE) History Information to a target NG-RAN CU in a handover message, the method comprising:
- determining that the UE History Information includes a previous Last Visited NG-RAN Cell Information entry indicating a new radio (NR) cell global identifier (CGI) that is the same as that of a current cell associated with the source NG-RAN CU;
- in response to determining that the UE History Information includes the previous Last Visited NG-RAN Cell Information entry:
  - identifying, within the UE History Information, a time in cell entry corresponding to the Last Visited NG-RAN Cell Information entry indicating the NR CGI;
  - determining that a sum of a time in the current cell plus a time in cell value of the identified time in cell entry meets or exceeds a maximum time; and
- updating, based on the determination that the sum meets or exceeds the maximum time, the time in cell entry to provide an updated Last Visited NG-RAN Cell Information in the UE History Information to send to the target NG-RAN CU in the handover message.

10. The method of claim 9, in which the source NG-RAN CU is a source next generation nodeB (gNB) CU (gNB-CU).

11. The method of claim 9, in which the source NG-RAN CU is a source-O-CU open-RAN (O-RAN) CU (O-CU).

12. The method of claim 9, in which the source NG-RAN CU is included in a public network.

13. The method of claim 9, in which the source NG-RAN CU is included in a visited network.

14. The method of claim 9, in which the source NG-RAN CU is included in a non-public network.

15. The method of claim 9, in which the source NG-RAN CU is included in a non-terrestrial network.

16. The method of claim 15, in which a Cell Type in Last Visited NG-RAN Cell Information entry is one of non-terrestrial network (NTN) lower earth orbit (LEO) Cell, NTN medium earth orbit (MEO), Cell NTN geostationary earth orbit (GEO) Cell, NTN high elliptical orbit (HEO) Cell, or NTN unmanned aerial system (UAS) Platform.

17. The method of claim 9, further comprising receiving from an NG-RAN distributed unit (DU) NR absolute radio frequency channel number (ARFCN) for reference point A in an F1 setup request or next generation nodeB (gNB) DU (gNB-DU) configuration update.

* * * * *